United States Patent [19]

Jochum

[11] Patent Number: 4,948,312

[45] Date of Patent: Aug. 14, 1990

[54] FASTENING ELEMENT WITH GUIDE MEMBER

[75] Inventor: Peter Jochum, Dürre Wiese, Austria

[73] Assignee: Hilti Aktiengesellschaft, Fürstentum, Liechtenstein

[21] Appl. No.: 341,133

[22] Filed: Apr. 20, 1989

[30] Foreign Application Priority Data

Apr. 20, 1988 [DE] Fed. Rep. of Germany ....... 3813245

[51] Int. Cl.$^5$ ..................... F16B 15/00; F16B 31/00
[52] U.S. Cl. ........................... 411/5; 411/368; 411/394; 411/441; 408/202
[58] Field of Search ............ 411/386, 387, 368, 369, 411/397, 383, 384, 3-5, 394, 440, 441; 408/72 R, 202, 215–220

[56] References Cited

U.S. PATENT DOCUMENTS

| | | | |
|---|---|---|---|
| 1,677,269 | 7/1928 | Burghart | 411/5 |
| 2,672,069 | 3/1954 | Mitchell | 411/533 |
| 3,812,757 | 5/1974 | Reiland | 411/5 |

FOREIGN PATENT DOCUMENTS 240912 10/1962 Australia ............................ 411/386

*Primary Examiner*—Neill R. Wilson
*Attorney, Agent, or Firm*—Toren, McGeady & Associates

[57] ABSTRACT

A fastening element to be driven into a hard receiving material, such as metal, includes a head at its trailing end and an axially extending shank projecting from the head to the leading end with a tip at the leading end. At least an axially extending section of the shank from adjacent the trailing end is threaded. A guide member is in threaded engagement with the shank and is spaced from the head when the fastening element is ready to be driven. The guide member is cup-like shaped with an opening facing toward the leading end. The guide member has a base extending transversely of the axial direction with a conically shaped section projecting radially outwardly from the base and axially toward the leading end. When the fastening element is driven into a receiving material, the guide member moves into contact with the head and is deformed when the driving of the fastening element is braked.

6 Claims, 1 Drawing Sheet

FASTENING ELEMENT WITH GUIDE MEMBER

BACKGROUND OF THE INVENTION

The present invention is directed to a fastening element to be driven into hard receiving materials, such as metal, and includes a head at its trailing end with means for entraining the head in a driving member for rotating the fastening element, and with a shank extending axially from the head. A cup-like shaped guide member is in threaded engagement with the shank. The shank has a tip at its leading end. The shank has an axially extending thread reaching from the trailing end toward the leading end.

In the past the so-called direct assembly or installation of plate-like members, such as sheet metal plates to a base structure, such as a steel girder, has been known where a nail-like fastening member is driven through the metal plate into the base structure, usually by means of an explosive powder charge. Such a process is effective and results in a high quality attachment, since a cold welding of the fastening element to the base structure takes place. Driving of the fastening element by means of a powder charge is independent of any other power supply, such as compressed air or electrical power. Such attachments can be disassembled, however, only with the destruction of the metal plates.

In another known type of fastening of metal plates, screws have been used. Recently, basically self-tapping screws with a drilling cutting edge have been used, so that the cutting edge drills holes into the metal plate, as well as into the base structure in which a thread is cut. While such an attachment is detachable, the drilling and thread-cutting procedures involve a considerable expenditure of time and the driving step is dependent on the supply source for operating a drilling and/or threading apparatus.

A fastening method for use in the above type of fastening elements is disclosed in DE-OS 24 21 917 which uses the known steps of direct installation by driving a fastening element through the metal plate and then into the base structure. The effective anchoring of the fastening element takes place manually, by means of conventional tooling, such as wrenches and the like. The fastener element used in this fastening method includes a head with means for rotational entrainment, and a threaded shank with a guide disk.

While this known fastening method has the advantage of being independent of any power supply as is the case in direct installation, there is, however, the considerable disadvantage of a high expenditure of time and considerable handling operations, since two procedures follow one after the other consecutively and must be performed with required tools. In other words, the driving-in operation is effected by a setting apparatus powered by an explosive powder charge and then the attachment procedure is completed by means of tools for applying torque to the fastening element.

In DE-OS 35 18 517, a driving device, constructed similar to a explosive powder operated setting device, is capable of performing an axial driving movement and, after completing a specific axial travel, of performing at least a rotational driving movement. The rotational driving movement may possibly overlap with an additional axial travel. The driving device has a twin piston formed by a shaft piston and an annular piston. The driving device operates, at the commencement of the driving procedure, so that the two pistons are accelerated together and when the shaft piston is braked, the annular piston imparts rotational movement to the shaft piston. As a result, it is possible to set thread cutting screws with this known driving device by driving the screws initially axially through metal plates into the base structure and then to brake the shaft piston depending on the resistance to the driving process, whereby with a rotationally locked connection between the shaft piston and the fastening elements, the fastening elements receive rotational movement for the final threading-in operation.

One problem in driving fastening elements with such a known driving device is that, depending upon the resistance to the driving of the fastening element by the metal plate and the base structure, braking of the shaft piston does not always occur at the same rate. If the shaft is prematurely braked, the fastening element is not sufficiently threaded into the base structure, or if there is little resistance to the driving procedure, the braking of the shaft piston occurs at a late point in the driving operation whereby the relatively high energy of the driving device does not afford sufficient threading-in of the fastening member.

SUMMARY OF THE INVENTION

Therefore, the primary object of the present invention is to provide a fastening element for use in the above-mentioned driving device operating similarly to an explosive powder charge operated setting device for assuring adequate anchoring values under different conditions, such as different resistances of metal plates and base structures.

In accordance with the present invention, the fastening element is provided with a cup-like shaped guide member with the base of the member in threaded engagement with the shank of the fastening element and with a radially outer end surface of the guide member facing toward the leading end of the fastening element extending axially outwardly from the surface of the base facing in the same direction.

When the fastening element is to be set using the driving device disclosed in DE-OS 35 18 517, mentioned previously initially, due to an explosive powder charge, there is an axial penetration of the fastening element shank through the metal plates and the base structure. At the outset of the driving operation, the guide member guides the fastening element as it is driven out of the driving device. This first part of the setting procedure is carried out by the shaft piston in the driving device. The braking of the shaft piston, based on the application of rotary motion to the fastening element, is aided by the cup-like shape of the guide member on the fastening element embodying the present invention. If the braking action occurs early in the setting operation when the resistance against the driving action is high, the cup-like shape of the guide member assures an adequate contact pressure of the metal plates against the base structure. On the other hand, if the resistance to the driving action on the fastening element is low, the cup-shaped guide member assures, with the impact of its leading end surface, the application of a sufficient braking action to the shaft piston, whereby the remaining available high energy is dissipated by the deformation of the cup-like shape of the guide member. Since the commencement of the thread is located in the region of the guide member, it is assured that the braking action on the shaft piston is of such magnitude when the thread impacts on the metal plates in the base structure, that a sufficient overlap of the rotary motion occurs. Due to the cup-like configuration of the guide member, it is assured that an adequate contact pressure of the metal plates is available under all conditions and further that shearing of the threaded connection by a late braking action on the shaft piston is avoided.

Preferably, the base of the guide member is arranged in the region of the start of the thread. The thread is started or commenced on the fastening element shank at a space location from its leading end. Accordingly, it is assured, in the event of low resistance to the driving process, that is, when high energy from the shaft piston still acts on the fastening element, a sufficient braking action takes place when the threads commence to impact against the metal plates and the base structure. As a result, the fastening element is able to shape its threads in the metal plates and the base structure. In addition, there is the possibility of providing a threaded connection between the guide member and the fastening element which further aids in maintaining the braking action at a high level, whereby an adequate rotational movement is imparted to the fastening member.

Preferably, the guide member has a radially outwardly extending wall section widening in a conically shaped manner from the radially outer edge of the base toward the leading end of the fastening element. With this guide member configuration, a large contact surface leading to high tightening values is generated acting on the metal plates, and, in addition, adequate connection is assured between the shank of the fastening element and the guide member.

Because of metal deformation considerations, the cone angle of the radially outer conically shaped section is in the range of 80° to 120°. Furthermore, a wall thickness of this radially outer section, increasing towards the radially outer edge, has an additional advantageous effect. Due to the wall thickness arrangement, which increases on the order of magnitude of 10% to 20%, the danger of weakening the guide member, during the driving process because of wear, is eliminated.

In another embodiment of the invention, a head is provided on the shank forming a stop shoulder spaced in the driving direction ahead of the head incorporating the rotational entrainment means. The two heads are interconnected by a rated break-off web. This rated break-off web forms a type of overload clutch, whereby even in the case of extremely low resistance to the driving of the fastening element, it is assured, if there is still high energy available from the driving device, the resulting torque does not cause shearing of the fastening element, rather the rated break-off web is severed and the head incorporating the rotational entrainment means is sheared off. Accordingly, the shaft piston, while energy is still available from the driving device, can spin freely even if the connection between the shaft piston and the head incorporating the rotational entrainment means has not been interrupted.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
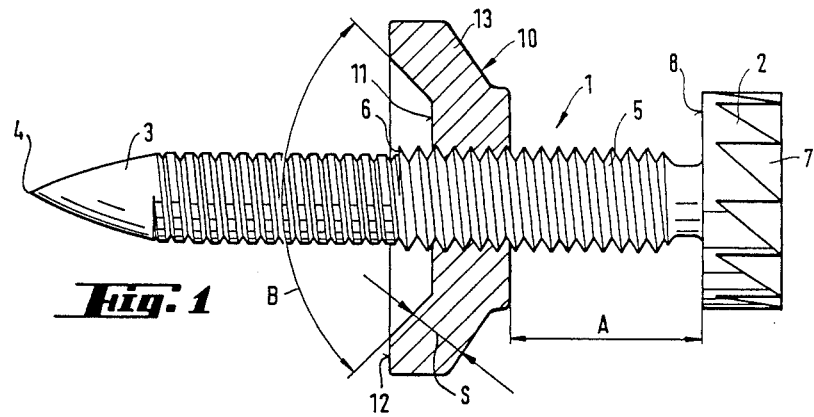
FIG. 1 is a axially extending view, partly in section, of a fastening element embodying the present invention and ready to be driven into a receiving material.
Figure 2:
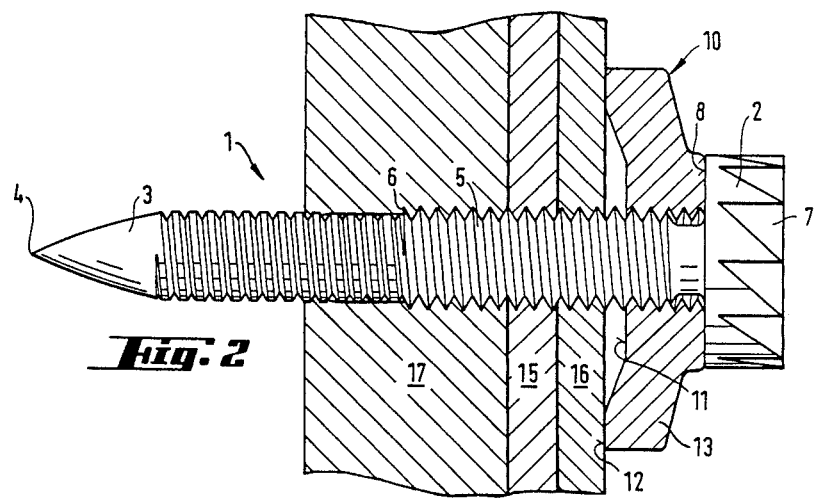
FIG. 2 is a view similar to FIG. 1, however, illustrating the fastening element in the completed anchored state in the receiving material.

In FIGS. 1 and 2, a fastening element 1 is displayed having a leading end at the left-hand side and a trailing end at the right-hand side.

At the trailing end, the fastening element has a cylindrical head 2 with an axially elongated shank 3 extending to the leading end. At the leading end, the shank has a pointed tip 4. Shank 3 has a thread 5 extending from adjacent the trailing end toward the leading end. In the axially extending leading end section of the shank, thread 5 is partially machined away providing a stepped down end 6 of the thread intermediate the ends of the shank. Head 2 has sawtooth-shaped rotational entrainment grooves 7 for engagement with a driving device. A guide member 10 is located on the thread 5 adjacent the leading end of the thread intermediate at the ends of the shank with the trailing end surface of the guide member spaced a distance A from the leading end face 8 of the head 2. As indicated above, this is the position of the guide member when the fastening element is ready to be driven. Guide member 10 has a cup-like shape with the opening facing toward the leading end of the shank. Guide member 10 includes a generally planar base 11 extending transversely of the axial direction of the shank and in engagement with the thread 5 on the shank. Spaced radially outwardly from and also located axially forwardly of the base 11 is an end surface 12 extending transversely of the axial direction of the shank and facing toward the leading end. The end surface 12 is formed by an annular wall section 13 extending radially outwardly from the base 11 and the thickness of the wall section increases from the base to its radially outer end which includes the end surface 12. The inner surface of the wall section 13 defining the cup-like shape of the guide member has a cone angle B in the range of 80° to 120°. As can be seen, the wall section 13 is generally conically shaped and its thickness increases from the base to the radially outer end define in part by the end surface 12.

In the completed attachment, displayed in FIG. 2, the fastening element 1 has penetrated through two metal plates 15, 16 and through a girder 17 behind the plates, accordingly, the plates are secured to the girder. In driving the fastening element into the plates 15, 16 and the girder 17, the fastening element has formed a thread in the girder. In the driving operation, the guide member 10 has moved rearwardly in threaded engagement with the shank 3 toward the head 2 until the guide member contacts the end face 8 of the head facing toward the leading end with the end surface 12 of the fastening member bearing against the surface of the plate 16.

While inserting the fastening element, the guide member as can be seen in FIG. 2, is deformed by the force applied by the head 2 against the guide member. If excess energy is present, it is consumed by the threaded movement of the guide member 10 on the shank and by the deformation of the guide member.

Figure 3:
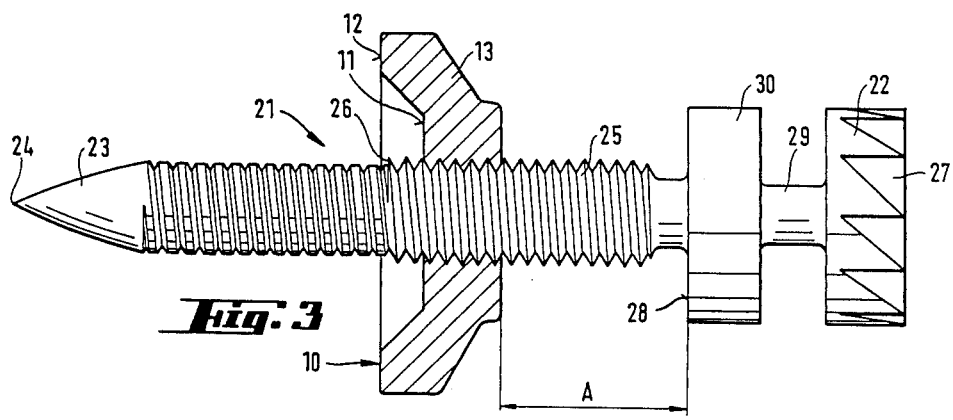
FIG. 3 is a view similar to FIG. 1 of another embodiment of the fastening element incorporating the present invention.

In FIG. 3, another embodiment of the invention is shown with fastening element 21 corresponding to the embodiment displayed in FIGS. 1 and 2. Accordingly, fastening element 21 has a head 22, an axially extending shank 23, with a tip 24 at its leading end. Shank 23 has a thread 25 extending along most of its length with the leading section of the thread being cut providing a shoulder 26 at approximately the mid-point of the thread. Head 22 has entrainment grooves 27 similar to that shown in the embodiment of FIGS. 1 and 2. A guide member 10 is initially positioned on the shank 23 as illustrated in FIG. 3 with the trailing surface of the guide member spaced an axial distance A from the end face 28 of the head facing toward the leading end. The difference between the embodiment in FIGS. 1 and 2, and that shown in FIG. 3, is the head 30 located between the head 22 and the trailing end of the thread 25. Head 30 forms a stop shoulder facing in the insertion direction, that is, toward the leading end or tip 24. The head 22 is connected to the head 30 by a rated break-away web 29. When the fastening element 21 is driven into a base material, the head 22 with the rotary entrainment grooves 27 is sheared off at the rated break-away web 29 after the fastening element has been completely threaded into the receiving material. Head 30 remains on the trailing end of the fastening element, however, it has no rotary entrainment means. As a result, the detachment or removal of the fastening element 21 is not possible without special means.

While specific embodiments of the invention have been shown and described in detail to illustrate the application of the inventive principles, it will be understood that the invention may be embodied otherwise without departing from such principles.

I claim:

1. A fastening element to be driven into hard receiving material such as metals comprising an axially elongated member having a leading end to be inserted first into the receiving material and a trailing end, said member having a head at the trailing end thereof including means for engagement with a device for rotationally driving said member, an axially elongated shank extending from the leading end to adjacent the trailing end, said shank having a tip at the leading end, a guide member mounted on said shank between the leading and trailing ends, said shank being threaded along at least an axially extending section from adjacent the trailing end toward the leading end, wherein the improvement comprises that said guide member has a cup-like shape with an opening formed by the cup-like shape facing toward the leading end of said member, said guide member comprising a base in threaded engagement with and encircling said shank and having a radially outer edge, said base being axially spaced at a distance A from the trailing end of said member when said fastening element is arranged to be driven into a receiving material, and a radially outer annular section projecting radially outwardly from said annular edge of said base and axially toward the leading end from said base, said annular section having an end surface extending transversely of the axial direction and facing toward the leading end with said end surface spaced axially from said base toward the leading end.

2. A fastening element, as set forth in claim 1 wherein said base has a surface facing toward the leading end of said shank and said surface being located adjacent to the leading end of said thread and spaced between the leading end of said thread and the trailing end thereof, when said fastening element is arranged to be driven into a receiving material.

3. A fastening element, as set forth in claim 1, wherein said annular section of said guide member widens conically outwardly from said outer annular edge of said base in the direction toward the leading end of said shank.

4. A fastening element, as set forth in claim 3, wherein said annular section has a conically shaped surface facing toward the leading end with a cone angle in the range of 80° to 120°.

5. A fastening element, as set forth in claim 4, wherein said annular section has a conically shaped surface closer to the trailing end of said fastening element and said annular section has a wall thickness between said conically shaped surfaces increasing radially outwardly from said base.

6. A fastening element, as set forth in claim 1, wherein another head is located on said shank between said head with said engagement means and the thread on said shank, said another head forming a stop shoulder extending transversely of the axial direction of said shank and facing toward the leading end thereof, and a rated break-away web extending axially between said head with said means for engagement and said another head.

* * * * *